US011250115B2

(12) United States Patent
Storm et al.

(10) Patent No.: US 11,250,115 B2
(45) Date of Patent: Feb. 15, 2022

(54) SPOOF DETECTION USING VIBRATION RESPONSE

(71) Applicant: Advanced New Technologies Co., Ltd., George Town (KY)

(72) Inventors: Gregory Lee Storm, Parkville, MO (US); Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 378 days.

(21) Appl. No.: 16/368,508

(22) Filed: Mar. 28, 2019

(65) Prior Publication Data

US 2020/0311235 A1    Oct. 1, 2020

(51) Int. Cl.
*G06F 21/32* (2013.01)
*G06F 3/01* (2006.01)
*G06F 21/12* (2013.01)

(52) U.S. Cl.
CPC ............. *G06F 21/32* (2013.01); *G06F 3/017* (2013.01); *G06F 21/121* (2013.01); *G06F 2221/2149* (2013.01)

(58) Field of Classification Search
CPC ... H04L 9/0891; H04L 9/3263; H04L 9/0643; H04L 9/0894; H04L 67/141; H04L 67/28; H04L 67/02; H04L 2209/76; H04L 67/42; H04L 63/061; H04L 63/0823; H04L 67/14
See application file for complete search history.

(56) References Cited

U.S. PATENT DOCUMENTS

| | | | |
|---|---|---|---|
| 2008/0059888 A1* | 3/2008 | Dunko | G06F 1/1613 715/744 |
| 2017/0076132 A1* | 3/2017 | Sezan | G06F 21/32 |
| 2017/0257479 A1* | 9/2017 | Marcum | H04M 1/72463 |
| 2018/0307310 A1* | 10/2018 | McCombe | H04N 13/243 |

\* cited by examiner

*Primary Examiner* — Mohammad W Reza
(74) *Attorney, Agent, or Firm* — Fish & Richardson P.C.

(57) ABSTRACT

Methods, systems, and apparatus, including computer programs encoded on a computer storage medium, for a biometric authentication system having anti-spoofing capabilities. A biometric authentication system can use a vibrating component of a mobile device to determine whether the mobile device is oriented in a self-portrait orientation or in an orientation other than the self-portrait orientation based on a vibration response signal received from sensors on the mobile device. In response to determining that the mobile device is oriented in an orientation other than the self-portrait orientation, the biometric authentication system can prevent access attempts to one or more secure systems.

17 Claims, 8 Drawing Sheets

SPOOF DETECTION USING VIBRATION RESPONSE

TECHNICAL FIELD

This disclosure relates to spoof detection for biometric authentication systems.

BACKGROUND

Biometric authentication using fingerprints, iris scans, facial recognition, voice characteristics, etc., can verify or identify a person. Systems incorporating biometric identification technology such as face recognition or iris recognition often include a camera that captures an image of a user. The captured image is then processed to authenticate the user using the corresponding biometric identification technology. Many mobile devices, such as smartphones and tablets, can include biometric technology to secure the contents of the mobile device or for use in accessing remote computer systems that are in communication with the mobile device.

SUMMARY

In at least one aspect, this document describes a method that includes receiving, from at least one sensor disposed on a mobile device, a vibration response signal indicative of an orientation in which the mobile device is being held. The vibration response signal is generated in response to a mechanical vibration of the mobile device. The method includes determining, based on the vibration response signal, that the orientation in which the mobile device is being held is different from a self-portrait orientation. The method also includes preventing, responsive to determining that the orientation in which the mobile device is being held is different from the self-portrait orientation, an access attempt to a secure system.

Preventing the access attempt to the secure system can further include determining, responsive to determining that the orientation in which the mobile device is being held is different from the self-portrait orientation, that a subject of an image captured using a camera of the mobile device is an alternative representation of a live person; and responsive to determining that the subject is an alternative representation of a live person, preventing the access attempt to the secure system.

The method can further include determining, based on the vibration response signal, that the orientation in which the mobile device is being held is the self-portrait orientation. The method can further include identifying, responsive to determining that the orientation in which the mobile device is being held is the self-portrait orientation, a subject of an image captured using a camera of the mobile device to be a live person. The method can further include, responsive to identifying the subject in the image to be a live person, initiating an authentication process for determining if the live person is authorized to access the secure system.

The at least one sensor can include an accelerometer. The at least one sensor can include a magnetometer. The at least one sensor can include a camera or an optical flow sensor. The at least one sensor can include two or more sensors comprising at least one of an accelerometer, a magnetometer, or a camera. Determining that the orientation in which the mobile device is being held is different from a self-portrait orientation can include performing an optical flow technique.

The vibration response signal can include a composite signal that is based on sensor signals from multiple sensors. Determining that the orientation in which the mobile device is being held is different from a self-portrait orientation can include comparing the vibration response signal to an expected vibrational response signal. Determining that the orientation in which the mobile device is being held is different from a self-portrait orientation can include using at least one of a coherence filter or a high-pass filter.

In another aspect, this document describes a system that includes a sensor module disposed in a mobile device, and an orientation detection module comprising on or more processing devices. The sensor module includes at least one sensor for detecting a vibration response signal due to a mechanical vibration of the mobile device. The orientation detection module receives, from the at least one sensor, the vibration response signal, which is indicative of an orientation in which the mobile device is being held. The orientation detection module determines, based on the vibration response signal, that the orientation in which the mobile device is being held is different from a self-portrait orientation, and in response, prevents an access attempt to a secure system.

Preventing the access attempt to the secure system can include determining, responsive to determining that the orientation in which the mobile device is being held is different from the self-portrait orientation, that a subject of an image captured using a camera of the mobile device is an alternative representation of a live person, and responsive to determining that the subject is an alternative representation of a live person, preventing the access attempt to the secure system.

In some implementation, the orientation detection module determines, based on the vibration response signal, that the orientation in which the mobile device is being held is the self-portrait orientation, and in response, identifies, a subject of an image captured using a camera of the mobile device to be a live person. Responsive to identifying the subject in the image to be a live person, the orientation detection module can initiate an authentication process for determining if the live person is authorized to access the secure system.

The at least one sensor can include at least one of an accelerometer or a magnetometer. The at least one sensor can include at least one of a camera or an optical flow sensor. Determining that the orientation in which the mobile device is being held is different from a self-portrait orientation can include performing an optical flow technique. The vibration response signal can include a composite signal that is based on sensor signals from multiple sensors. Determining that the orientation in which the mobile device is being held is different from a self-portrait orientation can include using at least one of a coherence filter or a high-pass filter.

In another aspect, this document describes one or more non-transitory computer-readable storage devices comprising computer-executable instructions which, when executed by one or more processing devices, cause the one or more processing devices to execute various operations. The operations include receiving, from at least one sensor disposed on a mobile device, a vibration response signal indicative of an orientation in which the mobile device is being held. The vibration response signal is generated in response to a mechanical vibration of the mobile device. The operations also include determining, based on the vibration response signal, that the orientation in which the mobile device is being held is different from a self-portrait orientation, and in response, prevent an access attempt to a secure system.

Embodiments of these systems and methods can provide one or more of the following advantages. By using the described systems and methods, malicious attempts to spoof a biometric authentication system via a mobile device can be detected and prevented quickly, using sensors that are readily available on the mobile device. For example, sensors such as accelerometers, camera, or magnetometers, which are typically available on mobile devices, can be used to determine whether or not the mobile device is being held in a self-portrait orientation, and such determination can be used to decide whether or not the mobile device is being used to authenticate a live human being. Thus, the security provided by the biometric authentication system is enhanced. Also, by allowing such quick discrimination between an image of a live person and an image of a spoof alternative representation, additional processing can be pre-emptively terminated, which can be particularly beneficial for resource-constrained environments of mobile devices.

Repeat use of reference characters in the present specification and drawings is intended to represent same or analogous features or elements.

DETAILED DESCRIPTION

This specification describes systems and methods in which chances of spoofing attacks on biometric authentication systems are mitigated by analyzing a vibration response signal detected by one or more sensors disposed on a mobile device. A mobile device having one or more sensors is caused to mechanically vibrate, and a dampening of the vibration (also referred to as a vibration response signal) due to a grip of the user is detected by the one or more sensors. The vibration response signal indicates an orientation in which the mobile device is being held. Specifically, the vibration response signal is analyzed to determine whether the mobile device is being held in a self-portrait orientation (often colloquially referred to as a "selfie" orientation) or in an orientation that is different from the self-portrait orientation. If it is determined that the mobile device is being held in an orientation other than the self-portrait orientation, attempts to access a secure system are prevented.

Many biometric authentication systems authenticate a user to a secure system based on recognizing the user's face, eye-print, iris etc. Such biometric authentication systems involve capturing one or more images of a user, and executing corresponding recognition processes on the captured image. Malicious attempts to breach the security of such biometric authentication systems can include presenting an alternative representation of a live person (e.g., a photograph or another image of the live person printed on paper, or displayed on a high definition display device) to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs). The technology described herein improves security/reliability of biometric authentication systems that rely on recognizing a user based on face recognition, eye-print recognition, iris recognition, and other biometric authentication techniques that use captured images. Specifically, this document describes preprocessing steps that allow for determining whether the captured image corresponds to an actual live person or a spoof alternative representation. Upon detecting that the captured image is a spoof, any further processing of the image to allow access to the corresponding secure system can be prevented, thereby adding an added layer of security to the system.

The functions of a human hand are associated with a sophisticated and versatile structural arrangement, and a complex control system. The way in which a human hand is used to grip something for a particular purpose can be significantly different from the way in which it is used to grip the same thing for another purpose. For example, the nature of a grip on a mobile device changes based on the orientation in which the user is holding the mobile device. When a user orients the mobile device such that the display and front-facing camera of the mobile device are oriented towards the user's face (e.g., in a self-portrait orientation or "selfie" orientation), the user will typically have a different grip on the mobile device than when the display and front-facing camera of the device are oriented away from the user's face. The technology described in this document allows for detecting such differences and variations in grips based on analyzing responses to a vibration of a mobile device, as detected using one or more sensors of the mobile device. For example, signals captured using one or more of an accelerometer, magnetometer, camera etc., during a time when a user grips a vibrating mobile device, can be analyzed to determine the orientation in which the mobile device is being held. Because, during a spoofing attempt, a mobile device is more likely to be held in an orientation that is different from the self-portrait orientation, the determination of the orientation of the mobile device during an authentication attempt can be used to predict whether or not the mobile device is likely being used in a spoofing attempt.

When a person holds a device, the hand and the device together constitute a specific mechanical system. In some implementations, the effect of a mechanical stimulus (e.g., a vibration) on such a mechanical system can be estimated by capturing a dampening of the vibrations in the grip of a user. For example, when a user holds a vibrating mobile device in a certain orientation (e.g., a self-portrait orientation), the response recorded by the sensors of the device can be indicative of the particular orientation. In some implementations, the response to the vibration signal is measured by the motion sensors (e.g., accelerometers, gyroscopes etc.) on the device, and the response varies based on how a person grips the device. Extracting the information contained in the response from the motion sensor outputs and, characterizing the unique features of such response in a way to distinguish and classify the orientation in which the mobile device is being held, allows for determining if the mobile device is being used in a spoofing attempt. Other sensors such as magnetometers or cameras can also be used, possibly in conjunction with any sensor that can be used to detect motion.

Figure 1A:
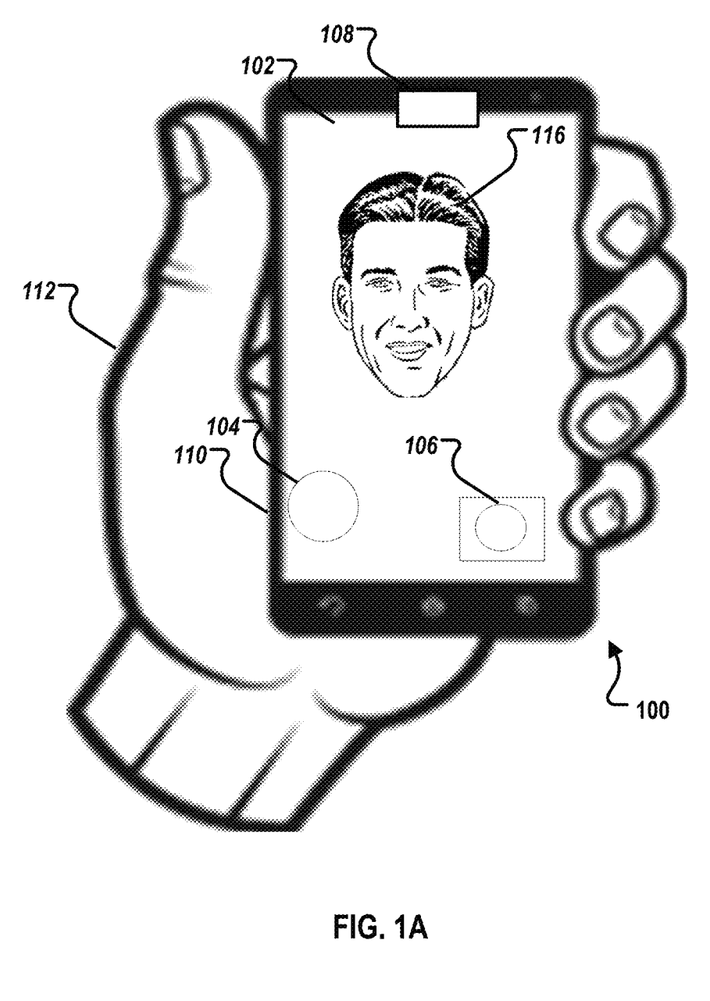
FIG. 1A shows a mobile device being used in a biometric authentication system.

FIG. 1A shows a mobile device being used in a biometric authentication system. In some implementations, the mobile device 100 is configured to capture biometric information of a user and authenticate the user by analyzing biometric information about the user (e.g., facial recognition, iris scan, etc.). In some implementations, the mobile device 100 is configured to capture the biometric information and transmit the biometric information to a remote computer system (e.g., a remote server), which authenticates the user based on the transmitted biometric information. Upon authentication, the user can be granted access to a subset of functions of one or more applications installed on the mobile device 100 and/or be granted access to a remote secure server, such as a banking server. The mobile device 100 includes one or more components that support a biometric authentication system. The mobile device 100 includes a display 102, a motor 104, one or more vibration sensors 106, a camera 108, and a surface 110, where a hand 112 of a user makes contact. The display 102 may also be used by the user to interact with the mobile device 100. For example, the display 102 may be a touch screen type of device displaying a user interface (UI) through which the user can enter and receive data.

In some implementations that rely on biometric authentication based on one or more features of the face or the eye, the user holds the mobile device 100 in a self-portrait or selfie orientation such that the camera 108 can capture an image of the user's eyes or at least a portion of the user's face 116. To authenticate the user, an underlying biometric authentication system can perform one or more biometric authentication techniques, such as facial recognition and/or iris scans, on the captured image. On the other hand, if a person is attempting to spoof the underlying biometric authentication system, the person is likely to hold the device in an orientation other than the self-portrait orientation, for example, in order to point the front-facing camera of the device towards an alternative spoof representation such as an image/photograph printed on paper or displayed on a high resolution display device. Such a situation is depicted in FIG. 1B.

Figure 1B:
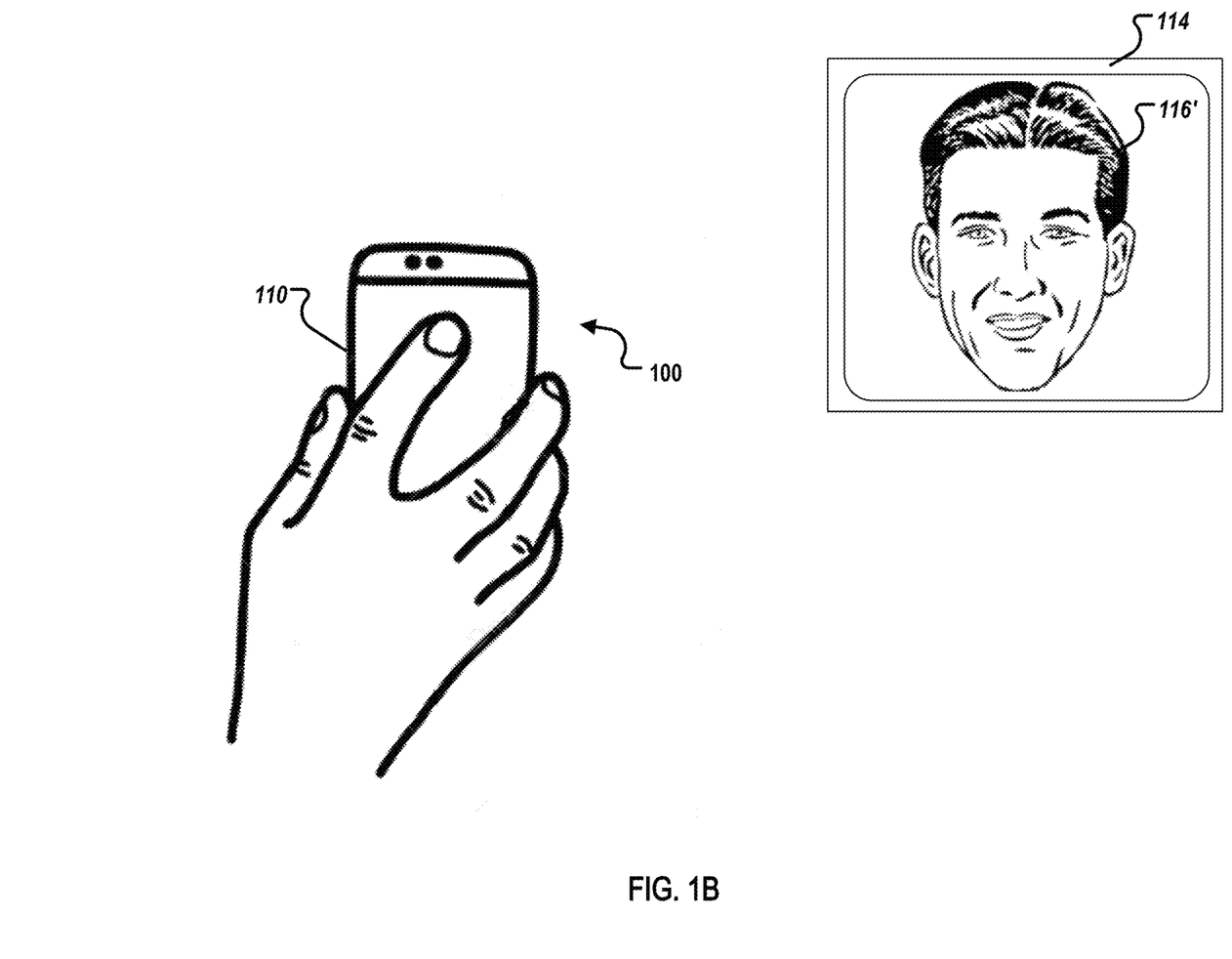
FIG. 1B shows an example of how a mobile device may be used in a malicious attempt to spoof a biometric authentication system.

Specifically, FIG. 1B shows an example of how a mobile device may be used in a malicious attempt to spoof a biometric authentication system. As shown, a user attempting to spoof the underlying biometric authentication system may hold the mobile device 100 with their hand such that the camera 108 is pointed towards an alternative representation of a live person (an image displayed on a high-resolution display device 114 in this example). In this scenario, the person displayed on the display device 114 is typically one that is authorized to access one or more secured systems to which the biometric authentication system is controlling access (i.e., the person is approved or authorized to access the systems), and the user of the mobile device 100 is making an unauthorized attempt to use an image 116' of the approved person's face to gain access to the one or more systems. Notably, for such an attempt the user is unlikely to hold the mobile device is a self-portrait orientation.

Referring back to FIG. 1A, during authentication, the motor 104 may be employed to generate vibrations in a predetermined way (for example, vibrating at a coded sequence of pulses) while the hand 112 grips the mobile device 100 for capturing the image of the user's eyes/face. The vibrations are damped to different extents depending, for example, on the orientation of the grip. The damped vibrations (or vibration response signals) can be detected by one or more sensors of the mobile device, and then analyzed to estimate/determine the likely orientation of the grip.

In some implementations, the damped vibrations can be detected using one or more mechanical sensors referred to herein as vibration sensors 106. In some implementations, the vibration sensors 106 include one or more accelerometers, for example, a piezoelectric accelerometer that measures the dynamic acceleration of the mobile device 100. In some implementations, the vibration sensors 106 include one or more gyroscopes that determine the changes to the orientation of the mobile device 100 due to the vibrations. In some implementations, the vibration sensors 106 include a magnetometer, which can detect the direction, strength, or relative change of a magnetic field at a particular location. For example, when a magnetometer moves in a magnetic field (e.g., the magnetic field of the Earth), a level of output of the sensor can be indicative of the amount of movement. Consequently, a magnetometer can determine a vibrational response of the mobile device 100 by measuring the movement of the mobile device 100 relative to the Earth's magnetic field. In some implementations, the vibrational response signal is a composite signal representing output from two or more of the vibration sensors 106. The amount of damping of vibrations, and consequently the output of the vibration sensors 106, depends on the grip being used to hold the mobile device 100. The damped vibrations traverse different paths before reaching the vibration sensors 106. As such, biometric information of the hand 112, such as gripping strength and gripping positions, is embedded in the signals captured by the vibration sensors 106. Therefore, a magnetometer output can be used to determine the extent to which a vibration is damped by the grip of the user, and that information in turn can be used to determine an orientation of the grip. In some implementations, a high-pass filter to the vibration response signal to reduce the effects of the Earth's magnetic field. In some implementations, the high-pass filter can be configured to remove components below a cutoff frequency of around 12 Hz.

In some implementations, the vibrations captured using the vibration sensors 106 are processed by the biometric authentication system to determine the orientation of the mobile device 100. The vibration signals are affected by specific characteristics of the user's hand, as well as the way in which the user grips the mobile device 100. For example, a user holding the mobile device 100 in a self-portrait orientation (as shown in FIG. 1A) is likely to grip the mobile device 100 using the palm area of their hand 112 and will likely place substantial pressure on the mobile device 100 where the person's palm area contacts the mobile device 100 using the fingertips of the hand 112. Contrarily, a person attempting to spoof the biometric authentication system is likely to hold the mobile device such that the camera 108 is facing away from the person's face and is instead pointed towards a spoof alternative representation of a live human being (e.g. a mask, a high resolution image displayed on a display device, or a high-quality image printed on paper). For example, referring back to FIG. 1B, the hand of the user attempting to spoof the biometric authentication system is gripping the mobile device 100 using the fingertips more than the palm to hold the mobile device 100. In many instances, holding the mobile device 100 in such a manner (e.g., in an orientation other than the self-portrait orientation) involves a looser, less secure grip. Thus, in some instances, the vibrational response of the mobile device 100 may be less damped when oriented in this manner as compared to the self-portrait orientation. Therefore, a grip signature can be determined by the orientation in which the person is holding the mobile device 100.

Referring back to FIG. 1A, in some implementations, the vibration response signal can be analyzed using images captured by one or more cameras (e.g. the camera 108) of the mobile device 100. This can be done in conjunction with, or in alternative to, using one or more vibration sensors 106. When using a camera to analyze the vibration response signal, the grip signature can be determined based on how the vibrations of the mobile device 100 affect the images/video captured by a back facing and/or front facing cameras of the mobile device 100. In some implementations, optical flow techniques can be used to extract from the captured images one or more features that can be used to characterize the vibration response, and hence determine a grip signature. Examples of the features include frequency, and amplitude of pixel shifts/motion blur within and across multiple frames and/or rolling shutter distortions (if a rolling shutter camera is disposed in the mobile device 100). In some implementations, a grip signature determined as a function of these features can be used to determine whether the mobile device is being held in a self-portrait orientation or another orientation different from the self-portrait orientation. In some implementations, optical flow techniques can be used to measure the pattern of apparent motion of objects, surfaces, and edges in a visual scene caused by the vibration of the mobile device 100. In some implementations, input from one or more optical flow sensors can be used in implementing the optical flow techniques.

In some implementations, a current vibrational response signal can be compared with an expected vibrational response signal to determine if the mobile device is being held in a self-portrait orientation. In some implementations, the expected vibrational response signal is represented in terms of a range of values of one or more sensor signal parameters known to be associated with a user holding the mobile device 100 in a self-portrait orientation. In some implementations, the expected vibrational response signal is represented in terms of a range of values one or more sensor signal parameters known to be associated with a user holding the mobile device 100 in an orientation other than the self-portrait orientation. In some implementations, the expected vibrational response is based on a stored/predetermined vibrational response signal of the user that was recorded at an earlier time while the user was holding the mobile device 100 in the self-portrait position. In some implementations, If the current vibrational response signal matches the expected response signal (e.g., within a predetermined error threshold value), the mobile device 100 can be determined as being held in a self-portrait position.

In some implementations, the orientation of the mobile device is determined based on a coherence between the vibration response signal and the original vibrations generated by the motor 104. In some implementations, a coherence filter is applied to the received vibration response signal to measure the coherence between the vibration response signal and the vibration initially generated by the motor 104 of the mobile device 100. For example, the coherence filter can be configured to filter the vibration response signal at the frequency at which the motor 104 of the mobile device 100 vibrates the mobile device 100 (e.g., 33 hertz, 50 hertz, etc.). The coherence filter can then be applied to the vibration response signal to measure the coherence between the initial vibration signal from the motor 104 and the vibration response signal from the vibration sensors 106. A more coherent relationship between the initial vibrations and the vibration response signals can indicate a tighter grip on the mobile device 100, which in turn can be indicative of the mobile device 100 being held in the self-portrait orientation. The resulting coherence value can be compared with an expected coherence value to determine the orientation of the mobile device 100.

In some implementations, the biometric authentication system uses a machine-learning process (e.g., a deep learning process implemented using a deep neural network architecture such as LSTM) to learn and extract features of the vibration response signal and associate these features with the orientation in which the mobile device 100 is being held. In some implementations, the mobile device 100 may communicate with one or more remote processing devices (e.g., one or more remote servers) that implement the machine learning process (see FIG. 2). For example, a machine learning module can be trained to discriminate between a self-portrait orientation and other orientations different from the self-portrait orientation based on features extracted from signals received from various combinations of sensors such as accelerometers, gyroscopes, magnetometers, cameras, optical flow sensors etc. During runtime, a vibrational response signal from one or more sensors can be analyzed to extract various features and classify the grip signature to represent a self-portrait orientation or another orientation.

Figure 2:
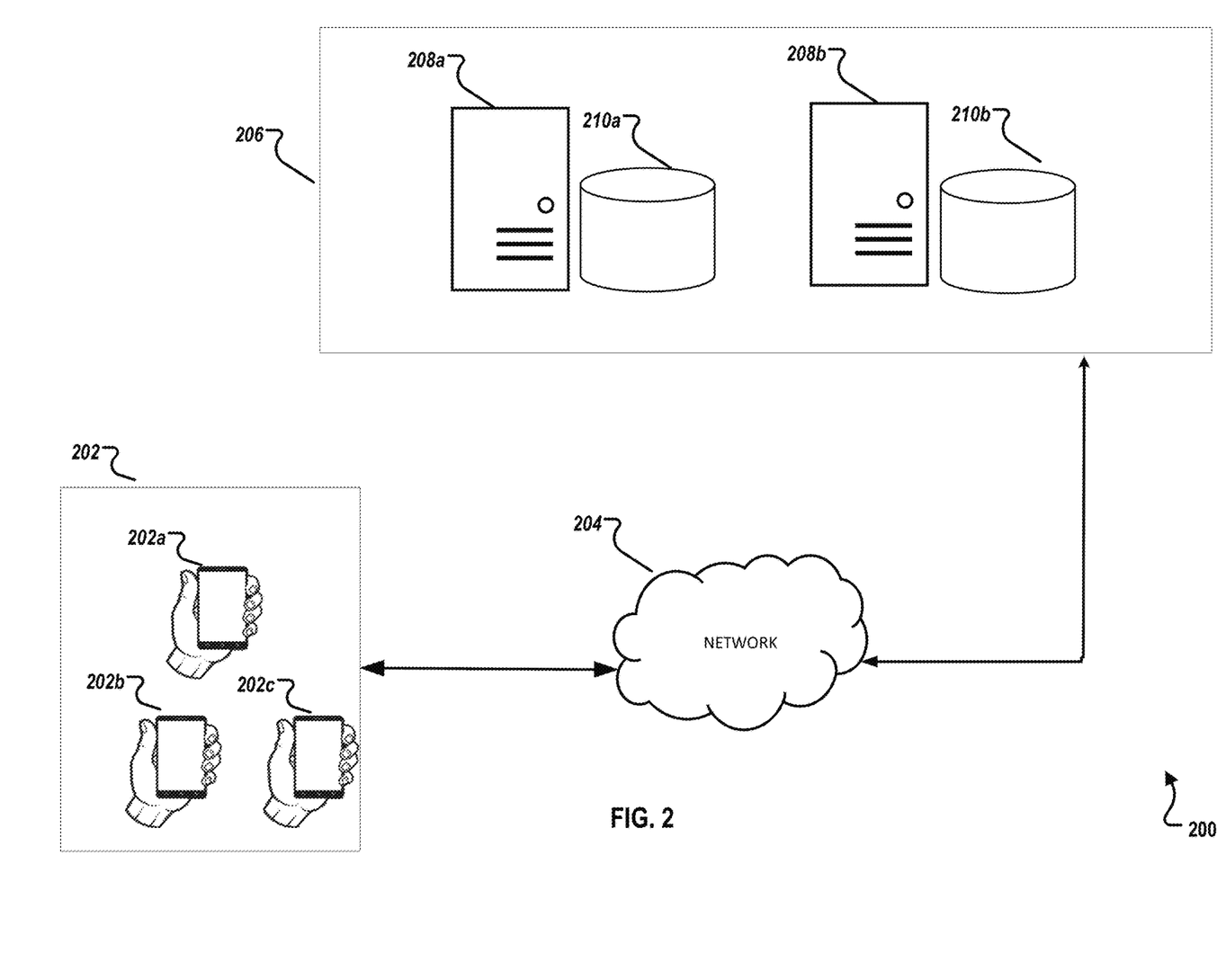
FIG. 2 is an example environment for executing a biometric authentication system having anti-spoofing capabilities.

FIG. 2 is an example environment for executing a biometric authentication system deployed on a mobile device, according to some implementations of the present disclosure. The example environment 200 includes one or more mobile devices 202, a network 204, and a back-end system 206. The mobile devices 202 are substantially similar to the mobile device 100 of FIG. 1. In some implementations, the network 204 includes a local area network (LAN), wide area network (WAN), the Internet, or a combination thereof, and connects mobile devices (e.g., the mobile devices 202) and the back-end system (e.g., the back-end system 206). In some implementations, the network 204 can be accessed over a wired and/or wireless communications link. In some implementations, the network 204 includes a cellular network.

In the depicted example, the back-end system 206 includes one or more remote server systems 208*a* and 208*b* (hereinafter as "remote server system 208") and remote data repositories 210*a* and 210*b* (hereinafter as "remote data repository 210"). In some implementations, the back-end system 206 provides access to one or more computer-implemented services with which the mobile device 202 may interact. The computer-implemented services may be hosted on, for example, the remote server system 208 and the remote data repository 210. The computer-implemented services may include, for example, an authentication service that may be used by the mobile device 202 to authenticate a user based on one or more biometric parameters of a user.

Within the back-end system 206, the remote server system 208 is connected to the remote data repository 210. In some implementations, the remote data repository 210 can be associated with the manufacturer of the mobile device 202. In some implementations, the remote data repository 210 can be associated with a third-party provider of mobile applications that may be downloaded and installed on the mobile device 202. The remote data repository 210 (e.g., a server, a database) can store expected vibrational response signals. An expected vibration response signal can be, for example, classified based on the device from which it originates. For example, a device can have multiple expected vibrational response signals stored in the remote data repository 210.

In some implementations, the back-end system 206 includes computer systems employing clustered computers and components to act as a single pool of seamless resources when accessed through the network 204. For example, such implementations may be used in a data center, cloud computing, storage area network (SAN), and network attached storage (NAS) applications. In some implementations, the back-end system 206 is deployed and provides computer-implemented services through a virtual machine(s).

Figure 3:
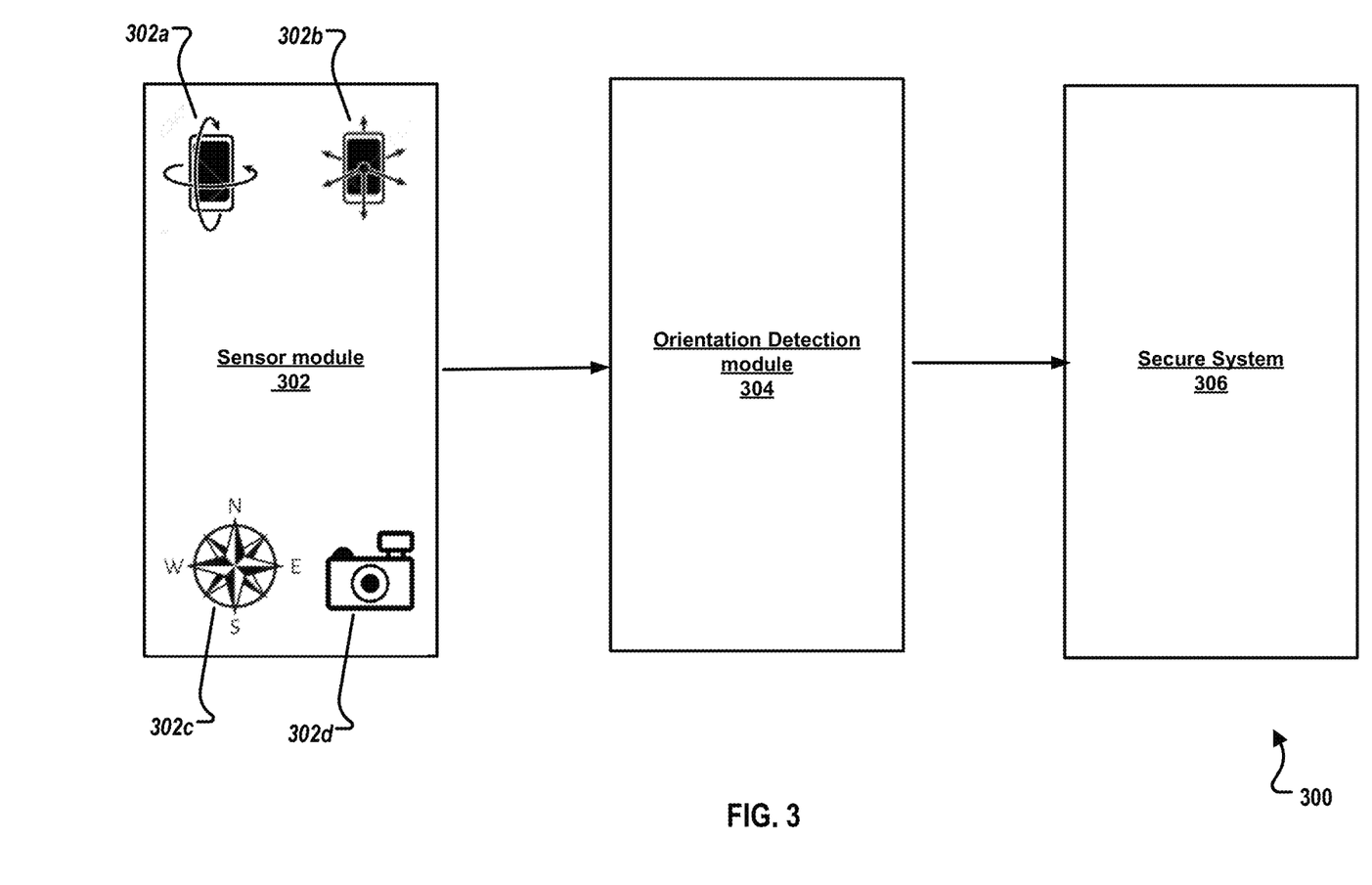
FIG. 3 shows an example system for implementing a biometric authentication system as described herein.

FIG. 3 shows an example system for implementing a biometric authentication system as described herein. The system 300 shown in this example includes a sensor module 302, an orientation detection module 304, and a secure system 306. The sensor module 302 is can be deployed, at least in part, on a mobile device (e.g., the mobile device 100 described above), and configured to detect damped vibrations due to grip forces applied by a user, and convert the detected vibrations to vibration response signals. In some implementation, the sensor module 302 includes one or more vibration sensors, such as an accelerometer 302*a*, a gyroscope 302*b*, a magnetometer 302*c*, and a camera 302*d*. Although the sensor module 302 is described as having four different vibration sensors, the sensor module 302 can include more or less vibration sensors. For example, in some implementations, the sensor module 302 includes only one accelerometer 302*a*. In some implementations, the sensor module 302 only includes one camera 302*d*. In some implementations, the sensor module does not include a gyroscope 302*b*. The sensor module 302 can also include two or more of a particular type of sensor. For example, the sensor module 302 can include two accelerometers 302*a* and/or two magnetometers. The input to the sensor module 302 are the damped mechanical vibrations resulting from the grip used to hold a vibrating mobile device. The output of the sensor module 302 can be a composite vibration response signal that includes one or more individual vibration response signals generated by the corresponding sensors. In some implementations, the output of the sensor module 302 includes the images captured by the camera 302*d* while the mobile device vibrates, or a set of features extracted from such images.

While the technology has been described primarily with respect to vibration sensors (e.g., accelerometers, gyroscopes, and magnetometers) and optical sensors (e.g., one or more cameras and optical flow sensors), other types of sensors that allow for measuring/characterizing movements of the mobile device 100 may also be used. For example, it may be possible to use a wireless module (e.g., a Bluetooth® module, near-field communication module, and/or a Wi-Fi module) of the mobile device to detect how the movement of the mobile device in a corresponding wireless network affects (or perturbs) one or more network parameters. It may also be possible to use one or more sound sensors (e.g., microphone) to detect sound information generated by the vibrating mobile device. Such information may also be used to measure/characterize the extent of dampening of a vibration of a mobile device, and hence used for the purposes described herein.

The orientation detection module 304 controls access to the secure system 306. Outputs from the sensor module 302 can be processed by the orientation detection module 304. In some implementations, the orientation detection module 304 executes on the mobile device. In some implementations, the orientation detection module 304 executes on a remote computer system, such as a remote server, that is communicatively coupled with the mobile device. The orientation detection module 304 can be configured to process the outputs from the sensor module 302 in various ways. In some implementations, one or more processors of the orientation detection module 304 are configured to compare the composite vibration response signal with an expected vibrational response signal to determine an orientation of the mobile device. In some implementations, the expected vibrational response signal is based on a range of values known to be associated with a user holding the mobile device in a self-portrait orientation. In some implementations, the expected vibration response signal is based on a range of values known to be associated with a user holding the mobile device in an orientation other than the self-portrait orientation. In some implementations, the expected vibration response signal is based on a stored/predetermined template signal of the user that was recorded at an earlier time while the user was holding the mobile device in the self-portrait position. In some implementations, if the vibration response signal matches the expected response signal (e.g., within a predetermined error threshold value), the orientation detection module 304 determines that the mobile device is being held in a self-portrait orientation.

In some implementations, the orientation detection module 304 uses a machine-learning process (e.g., a deep learning process implemented using a deep neural network architecture such as LSTM) to learn and extract features of the vibrational response signal and associate these features with the orientation in which the mobile device is being held. For example, in some implementations, the orientation detection module includes a machine learning module trained to discriminate between a self-portrait orientation and other orientations different from the self-portrait orientation based on features extracted from signals received from various combinations of sensors such as accelerometers, gyroscopes, magnetometers, cameras, optical flow sensors etc. During runtime, a vibrational response signal from one or more sensors can be analyzed to extract various features and classify the grip signature to represent a self-portrait orientation or another orientation. In some implementations, if orientation detection module 304 makes the determination that the mobile device is not being held in the self-portrait orientation, the orientation detection module 304 determines that the mobile device is being used in a spoof attempt on the biometric authentication system. In some implementations, if it is determined that the mobile device is being used in a spoof attempt, the orientation detection module 304 prevents access to the secure system 306. In some implementations, the secure system 306 is an operating system on the mobile device. In some implementations, at least portions of the secure system 306 is deployed on a remote server (e.g., a banking server).

Figure 4A:
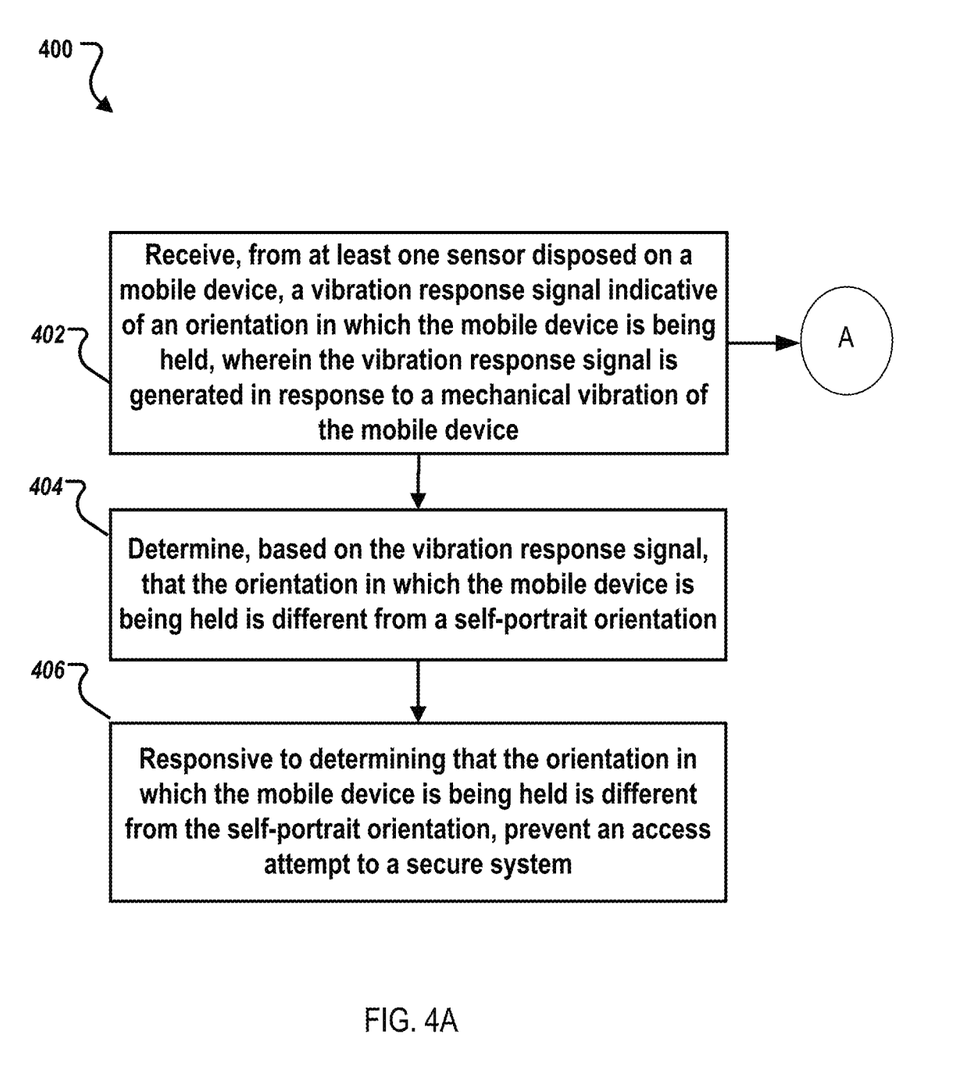
FIGS. 4A-4C are flowcharts illustrating examples of processes for analyzing vibration response signals to mitigate risks of spoofing attempts.

FIG. 4 is a flowchart illustrating an example process 400 for analyzing vibration response signals to mitigate risks of spoofing attempts, according to some implementations of the present disclosure. In some implementations, at least a portion of the process 400 can be executed by the orientation detection module 304 described previously with reference to FIG. 3. The process 400 includes receiving, from at least one sensor disposed on a mobile device, a vibration response signal indicative of an orientation in which the mobile device is being held, wherein the vibration response signal is generated in response to a mechanical vibration of the mobile device (block 402). The at least one sensor can include, for example, at least one of an accelerometer, a gyroscope, a magnetometer, a camera, or an optical flow sensor. In some implementations, the at least one sensor can include two or more sensors including at least one of an accelerometer, a magnetometer, or an optical sensor such as a camera or an optical flow sensor. In some implementations, the vibration response signal includes a composite signal that is based on sensor signals from multiple sensors.

The process 400 also includes determining, based on the vibration response signal, that the orientation in which the mobile device is being held is different from a self-portrait orientation (block 404). In some implementation (e.g., when the at least one sensor includes an optical sensor such as a camera or an optical flow sensor), this can include performing an optical flow analysis. In some implementations, determining that the orientation in which the mobile device is being held is different from a self-portrait orientation includes comparing the vibration response signal to an expected vibrational response signal. In some implementations, determining that the orientation in which the mobile device is being held is different from a self-portrait orientation includes using at least one of a coherence filter. For example, a coherence filter can be applied to the vibration response signal to measure a coherence between the vibration response signal and the vibration initially generated at the mobile device. A more coherent relationship between the initial vibrations and the vibration response signals can indicate a tighter grip on the mobile device, which in turn can indicate that the mobile device is being held in the self-portrait orientation. In some implementations, the resulting coherence value can be compared with an expected coherence value for different grips to determine the orientation of the mobile device. In some implementations that use a magnetometer as one of the vibration sensors, a high-pass filter can be applied to the vibration response signal to reduce the effects of the Earth's magnetic field. In general, the vibration response signal can be analyzed to determine the orientation of the mobile device using any of the ways as described above with reference to FIGS. 1A and 1B.

Figure 4B:
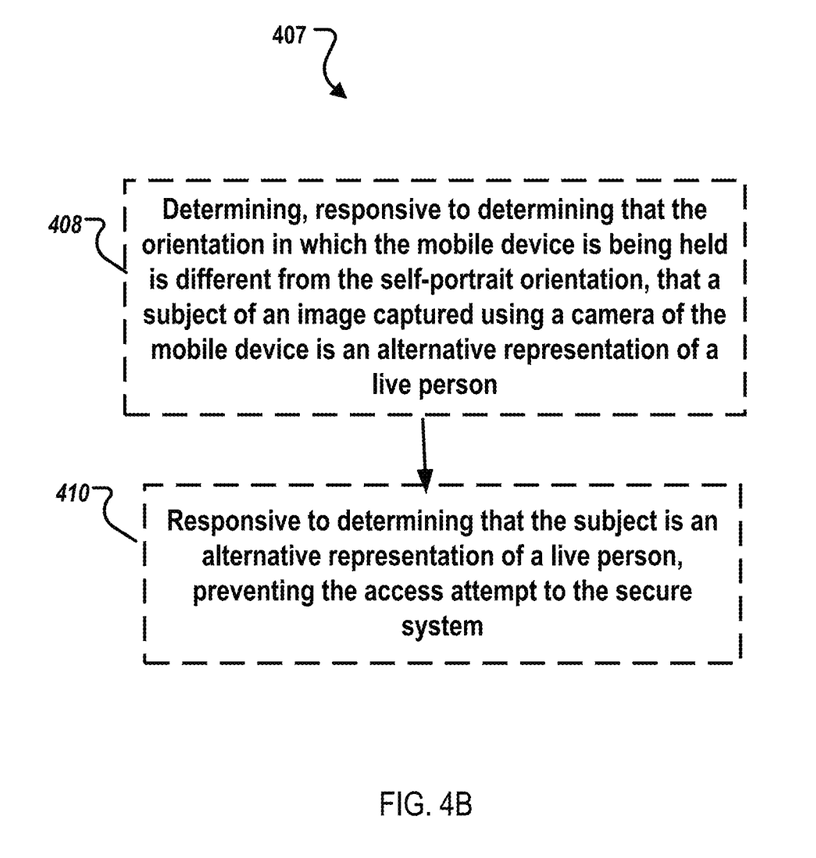

The process 400 includes, responsive to determining that the orientation in which the mobile device is being held is different from the self-portrait orientation, preventing an access attempt to a secure system (block 406). In some implementations, this can be done using a process 407 as shown in FIG. 4B. The process 407 includes determining, responsive to determining that the orientation in which the mobile device is being held is different from the self-portrait orientation, that a subject of an image captured using a camera of the mobile device is an alternative representation of a live person (block 408), and in response, preventing the access attempt to the secure system (block 410).

Figure 4C:
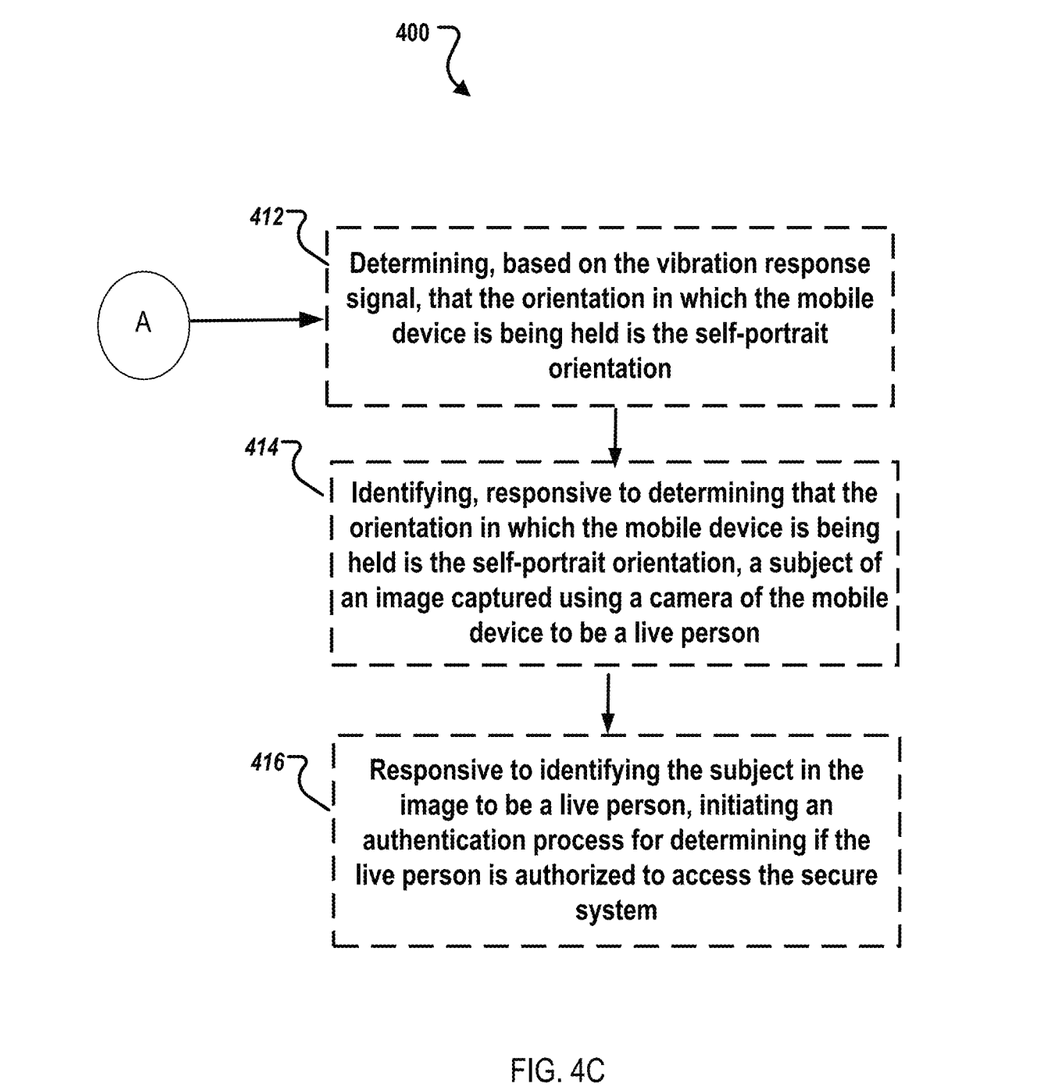

In some implementations, the process 400 can include an alternative prong after block 402 as shown in FIG. 4C. This prong of the process 400 includes determining, based on the vibration response signal, that the orientation in which the mobile device is being held is the self-portrait orientation (block 412). In response, a subject of an image captured using a camera of the mobile device is identified that to be of a live person (block 414), and accordingly, an authentication process for determining if the live person is authorized to access the secure system is initiated (block 416). In some implementations, this includes transmitting the image captured using the camera of the mobile device to a remote computing device (e.g., a server) that executes the authentication process based on that image. In some implementations, the authentication process may be executed at the mobile device itself. If the biometric authentication system determines that the captured biometric information belongs to a person authorized to access the secured system, the biometric authentication system can grant access to the secured system.

Figure 5:
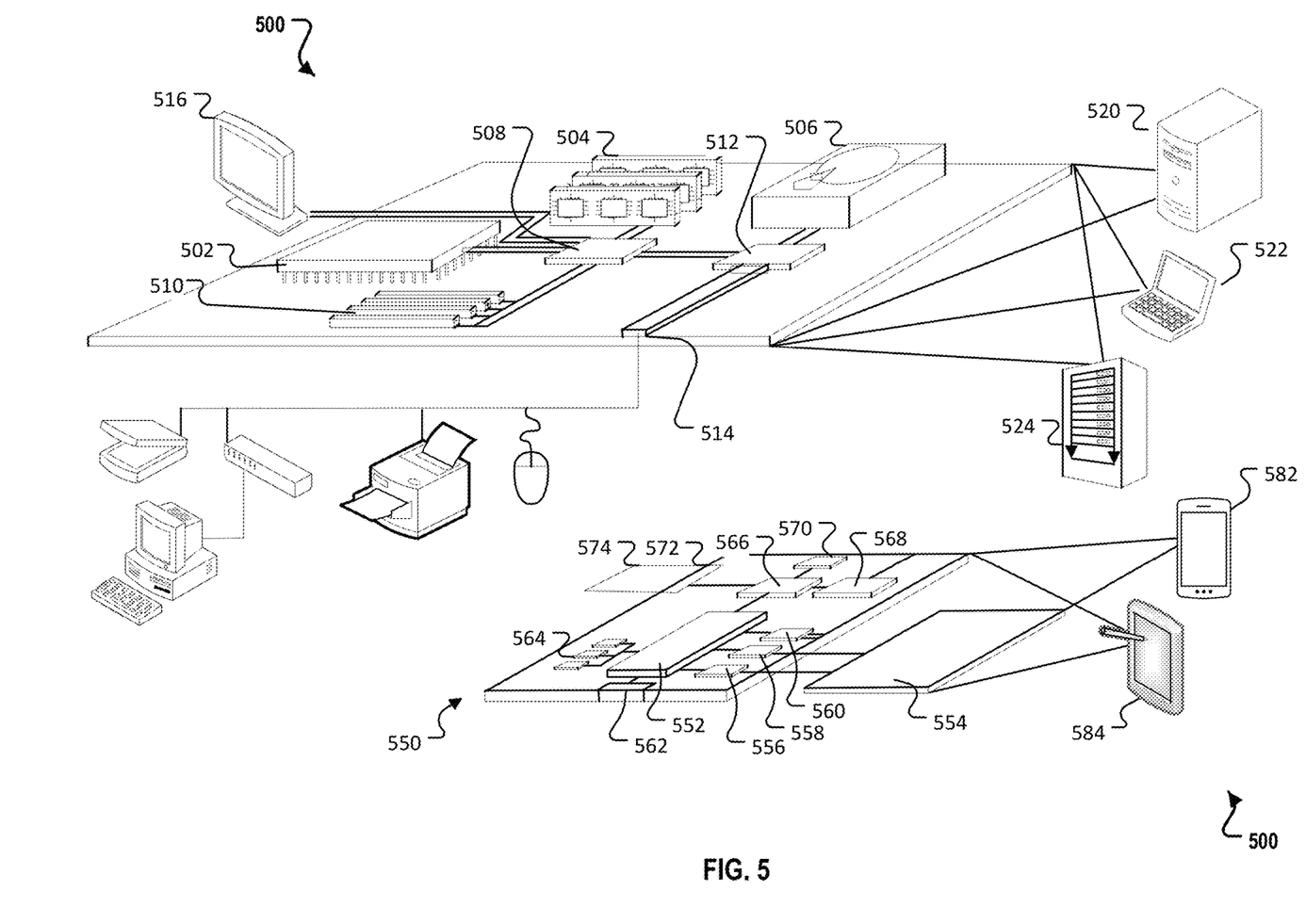
FIG. 5 is an example of a computing device and a mobile computing device that are employed to execute implementations of the present disclosure.

FIG. 5 is an example of a computing device 500 and a mobile computing device 550 that are employed to execute implementations of the present disclosure. For example, the mobile device 100 or 202 (as described above) or the servers 208 can be substantially similar to one of the computing device 500 or the mobile computing device 550 described herein. Also, the sensor module 302, orientation detection module 304, and/or the secure system 306 can be implemented using hardware as described with reference to the computing device 500 or the mobile computing device 550.

The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular devices, smart mobile devices, AR devices, and other similar computing devices. The components shown here, their connections and relationships, and their functions, are meant to be examples only, and are not meant to be limiting.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory devices, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices. Such input/output devices may include a scanner 530, a printing device 534, or a keyboard or mouse 536. The input/output devices may also be coupled to the low-speed expansion port 514 through a network adapter. Such network input/output devices may include, for example, a switch or router 532.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device, such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single In-Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may also include secure information. Thus, for example, the expansion memory 574 may be provided as a security module for the mobile computing device 550, and may be programmed with instructions that permits secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from mobile device calls, may include recorded sound (e.g., voice messages, music files, etc.), and may also include sound generated by applications operating on the mobile computing device 550.

The mobile computing device 550 may be implemented in a number of different forms, as shown in FIG. 5. For example, it may be implemented as the mobile device 100 described in FIG. 1. Other implementations may include a mobile device 582 and a tablet device 584. The mobile computing device 550 may also be implemented as a component of a smart-mobile device, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
receiving, from at least one sensor disposed on a mobile device, a first vibration response signal indicative of an orientation in which the mobile device is being held, wherein the first vibration response signal is generated in response to a mechanical vibration of the mobile device while the mobile device is being held to detect a live person;
determining, based on the first vibration response signal, that the orientation in which the mobile device is being held is a self-portrait orientation;
responsive to determining that the orientation in which the mobile device is being held is the self-portrait orientation, initiating a process to authenticate an access attempt to a system;
receiving, from the at least one sensor disposed on the mobile device, a second vibration response signal indicative of another orientation in which the mobile device is being held, wherein the second vibration response signal is generated in response to another mechanical vibration of the mobile device;
determining, based on the second vibration response signal, that the another orientation in which the mobile device is being held is different from the self-portrait orientation; and
responsive to determining that the another orientation in which the mobile device is being held is different from the self-portrait orientation, preventing the access attempt to the system.

2. The computer-implemented method of claim 1 wherein preventing the access attempt to the system comprises: determining, responsive to determining that the orientation in which the mobile device is being held is different from the self-portrait orientation, that a subject of an image captured using a camera of the mobile device is an alternative representation of the live person; and responsive to determining that the subject is an alternative representation of the live person, preventing the access attempt to the system.

3. The computer-implemented method of claim 1, wherein the at least one sensor comprises an accelerometer, a magnetometer, a camera, or an optical flow sensor.

4. The computer-implemented method of claim 1, wherein the at least one sensor comprises two or more sensors comprising at least one of an accelerometer, a magnetometer, or a camera.

5. The computer-implemented method of claim 1, wherein the at least one sensor comprises a camera, and determining that the orientation in which the mobile device is being held is the self-portrait orientation comprises:
performing an optical flow technique.

6. The computer-implemented method of claim 1, wherein the first vibration response signal comprises a composite signal that is based on sensor signals from multiple sensors disposed in the mobile device.

7. The computer-implemented method of claim 1, wherein determining that the orientation in which the mobile device is being held is the self-portrait orientation comprises one of:
comparing the first vibration response signal to an expected vibrational response signal; and
using at least one of a coherence filter or a high-pass filter.

8. A non-transitory, computer-readable medium storing one or more instructions executable by a computer system to perform operations comprising:
receiving, from at least one sensor disposed on a mobile device, a first vibration response signal indicative of an orientation in which the mobile device is being held, wherein the first vibration response signal is generated in response to a mechanical vibration of the mobile device while the mobile device is being held to detect a live person;
determining, based on the first vibration response signal, that the orientation in which the mobile device is being held is a self-portrait orientation;
responsive to determining that the orientation in which the mobile device is being held is the self-portrait orientation, initiating a process to authenticate an access attempt to a system;
receiving, from the at least one sensor disposed on the mobile device, a second vibration response signal indicative of another orientation in which the mobile device is being held, wherein the second vibration response signal is generated in response to another mechanical vibration of the mobile device;
determining, based on the second vibration response signal, that the another orientation in which the mobile device is being held is different from the self-portrait orientation; and
responsive to determining that the another orientation in which the mobile device is being held is different from the self-portrait orientation, preventing the access attempt to the system.

9. The non-transitory, computer-readable medium of claim 8, wherein preventing the access attempt to the system includes operations comprising:
determining, responsive to determining that the another orientation in which the mobile device is being held is different from the self-portrait orientation, that a subject of an image captured using a camera of the mobile device is an alternative representation of the live person; and
responsive to determining that the subject is an alternative representation of the live person, preventing the access attempt to the system.

10. The non-transitory, computer-readable medium of claim 8, wherein the at least one sensor comprises an accelerometer, a magnetometer, a camera, or an optical flow sensor.

11. The non-transitory, computer-readable medium of claim 8, wherein the at least one sensor comprises two or more sensors comprising at least one of an accelerometer, a magnetometer, or a camera.

12. The non-transitory, computer-readable medium of claim 8, wherein the at least one sensor comprises a camera, and determining that the orientation in which the mobile device is being held is the self-portrait orientation includes operations comprising:
performing an optical flow technique.

13. The non-transitory, computer-readable medium of claim 8, wherein the first vibration response signal comprises a composite signal that is based on sensor signals from multiple sensors disposed on the mobile device.

14. The non-transitory, computer-readable medium of claim 8, wherein determining that the orientation in which the mobile device is being held is the self-portrait orientation includes operations comprising one of:
comparing the first vibration response signal to an expected vibrational response signal; and
using at least one of a coherence filter or a high-pass filter.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, from at least one sensor disposed on a mobile device, a first vibration response signal indicative of an orientation in which the mobile device is being held, wherein the first vibration response signal is generated in response to a mechanical vibration of the mobile device while the mobile device is being held to detect a live person;
determining, based on the first vibration response signal, that the orientation in which the mobile device is being held is a self-portrait orientation;
responsive to determining that the orientation in which the mobile device is being held is the self-portrait orientation, initiating a process to authenticate an access attempt to a system;
receiving, from the at least one sensor disposed on the mobile device, a second vibration response signal indicative of another orientation in which the mobile device is being held, wherein the second vibration response signal is generated in response to another mechanical vibration of the mobile device;
determining, based on the second vibration response signal, that the another orientation in which the mobile device is being held is different from the self-portrait orientation; and responsive to determining that the another orientation in which the mobile device is being held is different from the self-portrait orientation, preventing the access attempt to the system.

16. The computer-implemented system of claim 15, wherein preventing the access attempt to the system includes one or more operations comprising:
  determining, responsive to determining that the another orientation in which the mobile device is being held is different from the self-portrait orientation, that a subject of an image captured using a camera of the mobile device is an alternative representation of the live person; and
  responsive to determining that the subject is an alternative representation of the live person, preventing the access attempt to the system.

17. The computer-implemented system of claim 15, wherein determining that the orientation in which the mobile device is being held is the self-portrait orientation includes one or more operations comprising:
  comparing the first vibration response signal to an expected vibrational response signal; and
  using at least one of a coherence filter or a high-pass filter.

\* \* \* \* \*

UNITED STATES PATENT AND TRADEMARK OFFICE
CERTIFICATE OF CORRECTION

| | |
|---|---|
| PATENT NO. | : 11,250,115 B2 |
| APPLICATION NO. | : 16/368508 |
| DATED | : February 15, 2022 |
| INVENTOR(S) | : Gregory Lee Storm and Reza R. Derakhshani |

It is certified that error appears in the above-identified patent and that said Letters Patent is hereby corrected as shown below:

In the Claims

Column 17, Line 1, in Claim 2, delete "claim 1" and insert -- claim 1, --.

Signed and Sealed this
Fifth Day of July, 2022

Katherine Kelly Vidal
*Director of the United States Patent and Trademark Office*